United States Patent [19]
Fuchs

[11] 3,866,481
[45] Feb. 18, 1975

[54] TORQUE-LOADING DEVICE

[75] Inventor: John R. Fuchs, Leawood, Kans.

[73] Assignee: General Motors Corporation, Detroit, Mich.

[22] Filed: Oct. 23, 1973

[21] Appl. No.: 408,330

[52] U.S. Cl. .................... 74/89.15, 73/1 C, 74/459
[51] Int. Cl. ............................................ F16h 27/02
[58] Field of Search ............. 74/89.15, 459; 73/1 C

[56] References Cited
UNITED STATES PATENTS

| | | | |
|---|---|---|---|
| 3,115,029 | 12/1963 | Better | 73/1 C |
| 3,244,022 | 4/1966 | Wysong, Jr. | 74/459 |
| 3,659,683 | 5/1972 | Betzing | 74/459 |
| 3,740,999 | 6/1973 | Whitehouse | 73/1 C |

*Primary Examiner*—Wesley s. Ratliff, Jr.
*Attorney, Agent, or Firm*—John P. Moran

[57] ABSTRACT

A device for applying a load to a rotary power tool, including a ball-screw drive arrangement for changing rotary movement of the power tool to axial movement, and associated variable compressible means, such as concave-shaped disc springs or a controlled bellows unit, for providing a counter-force to the resultant axial movement, with a predetermined rate of force build-up developed within the compressible means, and a maximum force developed proportional to the torque output of the power tool.

3 Claims, 3 Drawing Figures

TORQUE-LOADING DEVICE

This invention relates generally to variable loading devices and, more particularly, to devices for simulating torque-loadings of rotary power tools in their normal operations.

Rotary power tools in use today are of two general classes, i.e., either direct or adjustable clutch drives. The former is used in applications wherein the maximum torque applied is limited only by the capacity of the power tool. The adjustable clutch arrangement is such that the tool may be preset to correspond to the torque requirements of a particular application. As a result, once the preset tension has been reached, the clutch separates. It is thus important to have ready access to a load-simulating device to regularly check the adjustment settings of the tool.

Accordingly, an object of the invention is to provide an improved load-simulating device which is simple, rugged and highly efficient.

Another object of the invention is to provide an improved variable loading device which includes means for translating rotary movement to linear movement in as frictionless a manner as possible; and efficient means for resisting the linear movement in a controlled manner, thereby providing torque loads simulating those of a power tool driving a fastener, for example.

A further object of the invention is to provide an improved torque-loading device wherein the rotary movement of a shaft to which a power tool is connected is translated into linear movement by a recirculating ball-screw drive arrangement, and wherein suitable abutting sets of concave disc springs are used to resist and control the linear movement of the shaft until the power tool stops, after which the ball-screw drive arrangement permits the springs to return the shaft to its original position, ready to begin a new cycle.

Still another object of the invention is to provide an improved torque-loading device wherein the rotary movement of a shaft to which a power tool is connected is translated into linear movement by a recirculating ball-screw drive arrangement, and wherein bellows means is used to resist the linear movement of the shaft until the power tool stops, thus making possible, via an associated fluidic circuit, a maximum torque build-up at a variable rate, after which the ball-screw drive arrangement permits the bellows to return the shaft to its original position, ready to begin a new cycle.

These and other objects and advantages of the invention will be apparent when reference is made to the following description and accompanying drawings, wherein.

Figure 1:
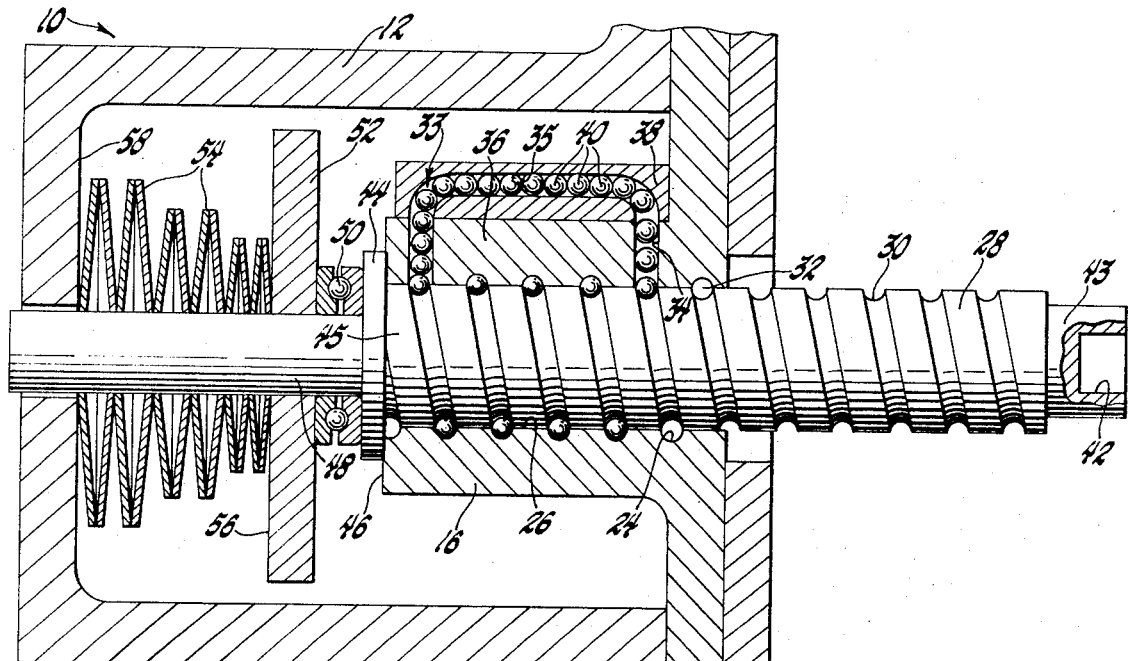
FIG. 1 is a cross-sectional view of a torque-loading device embodying the invention.

Referring now to the drawings in greater detail, FIG. 1 illustrates a torque-loading device 10 including a cup-shaped housing 12 having a flange 14 formed on the open end thereof. A sleeve member 16 is concentrically mounted in the housing 12. A collar 18 is formed on the sleeve member 16 for confinement between the flange 14 and a support member or fixed abutment 20, and secured thereto by any suitable means, such as bolts 22.

A spiral groove 24 is formed along the full length of the bore 26 of the sleeve member 16. A shaft 28, having a spiral groove 30 formed along the full length of the outer periphery thereof, is rotatably mounted in the bore 26 such that the spiral grooves 24 and 30 are radially aligned to form a spiraling conduit 32.

A U-shaped conduit 33 having radial legs 34 and an interconnecting longitudinal passage 35, is formed in the sleeve member 16. If desired, the wall of the sleeve member 16 may be made thicker such as at wall portion 36, by the mounting thereon of an arcuate plate 38, in order that the radial legs 34 may be formed in the wall portion 36 and the longitudinal passage 35 formed in the arcuate plate 38. A plurality of balls 40 are mounted in the conduit 33, the number thereof being sufficient to fill the entire length of the conduit 33. The open ends of the U-shaped conduit 33 terminate at the bore of the sleeve member 16, aligning with the spiral grooves 30. The balls 40 thus leave the conduit 33 to enter the spiraling conduit 32 to serve as a recirculating ball-screw drive arrangement for advancing the shaft 28 along the axis of the sleeve member 16.

A socket head 42 is formed in the exposed end 43 of the shaft 28, while a flange 44 is formed on the inner end 45 of the shaft 28, adjacent the end face 46 of the sleeve member 16. A stem 48 is formed on the flange 44 to extend therefrom along the axis of the shaft 28.

A bearing 50 is mounted around the stem 48 intermediate the flange 44 and a retainer plate or disc 52, the latter also being mounted around the stem 48. A plurality of different diameter sets of abutting cup-shaped or concave disc springs 54 are mounted around the stem 48 intermediate the face 56 of the plate 52 and the end wall 58 of the housing 12. As illustrated in FIG. 1, the cup-shaped springs 54 are of the same diameter, with alternate sets facing in opposite directions, such that the concave sides of adjacent pairs of sets face each other while their extreme outer convex edges abut against adjacent convex edges of adjacent sets.

Figure 2:
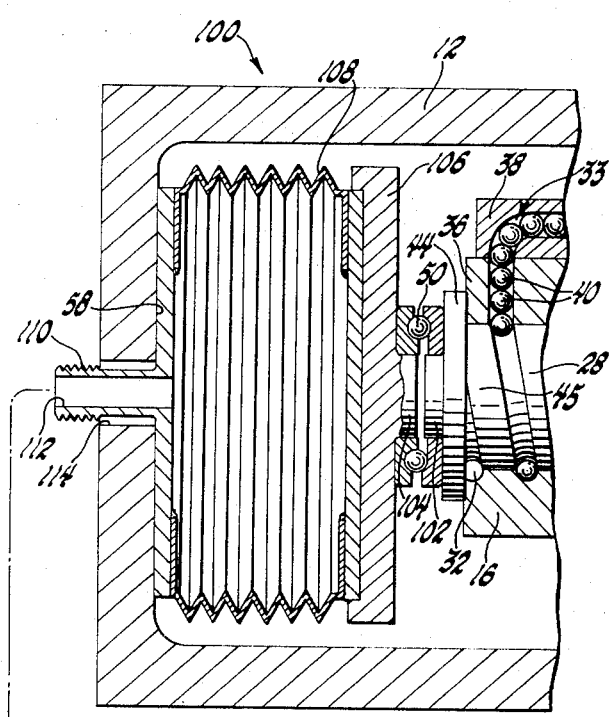
FIG. 2 is a fragmentary cross-sectional view of an alternate embodiment of a portion of the FIG. 1 structure.
Figure 2:
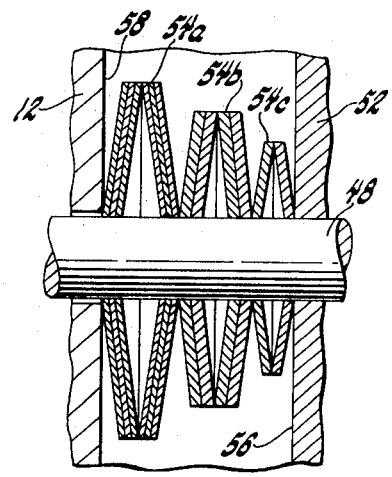

As illustrated in FIG. 2, other combinations of cup-shaped springs 54 can be used, e.g., the first two facing pairs of spring sets may include springs 45a of a particular outer diameter and individual spring thickness, with two such springs 54a in each set; while the next two facing pairs of spring sets may include springs 54b of a smaller outer diameter and narrower individual spring thickness than for springs 54a, with three such springs 54b in each set; while the next two facing pairs of spring sets may include springs 54c of still a smaller outer diameter and still narrower individual spring thickness than for springs 54b; it being understood that any desired plurality of combinations of quantity, outer diameter, and thickness of adjacent pairs of spring sets may be utilized to suit the particular power tool involved. The extreme outside convex faces of adjacent sets, of course, about against one another regardless of the combination of spring characteristics involved.

In operation, a rotary power tool (not shown), the output torque of which is to be absorbed, is connected to the socket head 42 formed on the end of the shaft 28. The effect of applying torque to the shaft 28 is to rotate the latter, with the balls 40 and spiraling conduit 32 serving to translate the rotary motion thereof to linear motion in the well-known, substantially frictionless manner.

The linear movement of the shaft 28, flange 44, and retainer disc 52 thus serves to compress the sets of springs 54 at a predetermined rate dependent on the manner in which various springs or different diameters and/or thicknesses are combined, until the maximum torque output of the power tool is reached, i.e., once the torque applied to the shaft 28 can no longer overcome the progressively increasing resistance of the springs 54, the rotary tool stops or stalls. The aforementioned torque output may be constantly measured and recorded by suitable means, not shown, but well known in the art, located, for example, between the power tool and the socket head 42 of the shaft 28.

FIG. 3 Embodiment

Figure 3:
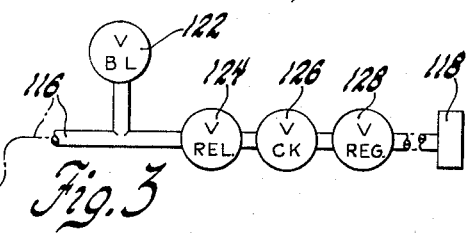
FIG. 3 is a fragmentary cross-sectional view of an alternate embodiment of the invention.

In the torque-loading device 100 of FIG. 3, those elements which are the same as those in FIG. 1 bear the same reference numerals. The spring arrangement of FIG. 1 is replaced in FIG. 3 by a bellows arrangement, as will now be described.

The bearing 50 is mounted around adjacent axially aligned stubshafts 102 and 104 formed, respectively, on the flange 44 and on a bellows retainer plate 106. A bellows unit 108 is mounted between the retainer plate 106 and the end wall 58 of the housing 12. A threaded fitting 10, including an inlet 112, extends through an opening 114 formed through the wall 58. A line 116 communicates between the fitting 110 and a fluid pressure source, represented generally at 118.

Operatively associated with the line 116 are a bleed valve 122, a relief valve 124, a check valve 126, and a constant pressure outlet valve 128. The bleed valve 122 serves to control the rate of torque build-up; the relief valve 124 controls the maximum torque build-up; and the constant pressure outlet valve 128 regulates the amount of preload.

Once a power tool (not shown), whose maximum torque is to be checked, is connected to the socket head 42 of the shaft 28 and run until stopped or stalled, the bellows unit 108 will have compressed accordingly at a predetermined rate determined by selected adjustments of the valves 122, 124, 126, and 128, until the maximum torque output of the power tool is reached, i.e., once the torque applied to the shaft 28 can no longer overcome the progressively increasing resistance of the bellows 108, the rotary tool stops or stalls. The aforementioned torque output may be constantly measured and recorded by suitable means, not shown, but well known in the art, located, for example, between the power tool and the socket head 42 of the shaft 28.

Once the power tool being checked has stalled, the recirculating ball-screw drive arrangement 40/32 permits the pressure within the bellows unit 108 to elongate the bellows unit and thus cause the shaft 28 to return to its original position.

It should be apparent that the invention provides a simplified, fast and highly efficient means for variably loading a rotary power tool in a manner which simulates the torque of a power tool when applied to a particular operation, such as driving a fastener.

While but two general embodiments of the invention have been shown and described, other modifications thereof are possible.

I claim:

1. A device for providing torque-loading of a rotary power tool, said device comprising a housing, a sleeve member mounted in said housing, a shaft rotatably mounted through said sleeve member, circumferentially aligned spiral grooves formed in said sleeve member and on said shaft, said spiral grooves cooperating to form a spiraling conduit throughout the length of said sleeve member, a plurality of balls operatively connected to said spiraling conduit, said cooperating balls and spiralling grooves serving to change rotary movement of said shaft to axial movement thereof in response to torque applied to the exposed end of said shaft, bellows means mounted in said housing intermediate an end wall thereof and the inner end of said shaft and arranged to provide a counter-force to said axial movement of said shaft, a source of fluid under pressure for said bellows means, and means for varying the pressure of said fluid within said bellows means to predetermined levels.

2. A device for providing torque-loading of a rotary power tool, said device comprising a housing, a sleeve member mounted in said housing, a shaft rotatably mounted through said sleeve member, means formed on the outer end of said shaft adapted for the mounting thereon of said rotary power tool, circumferentially aligned spiral grooves formed in said sleeve member and on said shaft, said spiral grooves cooperating to form a spiraling conduit throughout the length of said sleeve member, a storage conduit formed in a wall portion of said sleeve member, the open ends of said storage conduit being aligned with spaced portions of said spiraling conduit, a plurality of balls retained in said storage conduit for rolling cooperation with said spiraling conduit, said cooperating balls and spiraling grooves serving to change rotary movement of said shaft to axial movement thereof in response to torque applied to the exposed extended end of said shaft, a flange formed on the inner end of said shaft for initially abutting againsit the end face of said sleeve member, a retainer plate axially aligned with said flange, bearing means mounted intermediate said retainer plate and said flange, a bellows unit mounted in said housing intermediate an end wall thereof and the adjacent face of said retainer plate and arranged to provide a counter-force to said axial movement of said shaft, and a source of fluid under pressure for said bellows unit.

3. A device for providing torque-loading of a rotary power tool, said device comprising a housing, a sleeve member mounted in said housing, a shaft rotatably mounted through said sleeve member, means formed on the outer end of said shaft adapted for the mounting thereon of said rotary power tool, circumferentially aligned spiral grooves formed in said sleeve member and on said shaft, said spiral grooves cooperating to form a spiraling conduit throughout the length of said sleeve member, a storage conduit formed in a wall portion of said sleeve member, the open ends of said storage conduit being aligned with spaced portions of said spiraling conduit, a plurality of balls retained in said storage conduit for rolling cooperation with said spiraling conduit, said cooperating balls and spiraling grooves serving to change rotary movement of said shaft to axial movement thereof in response to torque applied to the exposed extended end of said shaft, a flange formed on the inner end of said shaft for initially abutting against the end face of said sleeve member, a retainer plate axially aligned with said flange, bearing means mounted intermediate said retainer plate and said flange, a bellows unit mounted in said housing intermediate an end wall thereof and the adjacent face of said retainer plate and arranged to provide a counter-force to said axial movement of said shaft, a source of fluid under pressure for said bellows unit, and means for varying the pressure of said fluid within the bellows unit to predetermined levels.

* * * * *